US009111206B1

(12) United States Patent
Simmons et al.

(10) Patent No.: US 9,111,206 B1
(45) Date of Patent: *Aug. 18, 2015

(54) METHOD AND APPARATUS FOR STORING IMAGE DATA IN A MEMORY OF AN IMAGE DEPOSITION DEVICE

(71) Applicant: Marvell International Ltd., Hamilton (BM)

(72) Inventors: Asher Simmons, Corvallis, OR (US); James Mealy, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 6 days.

This patent is subject to a terminal disclaimer.

(21) Appl. No.: 13/917,823

(22) Filed: Jun. 14, 2013

Related U.S. Application Data

(63) Continuation of application No. 11/972,462, filed on Jan. 10, 2008, now Pat. No. 8,472,066.

(60) Provisional application No. 60/884,517, filed on Jan. 11, 2007.

(51) Int. Cl.
*G06K 15/02* (2006.01)
*H04N 1/40* (2006.01)
*H04N 1/405* (2006.01)
*G06F 3/12* (2006.01)

(52) U.S. Cl.
CPC .................... *G06K 15/1886* (2013.01)

(58) Field of Classification Search
CPC .................... G06K 15/02; B41J 3/36
See application file for complete search history.

(56) References Cited

U.S. PATENT DOCUMENTS

| | | | |
|---|---|---|---|
| 4,757,309 A | 7/1988 | Bowater et al. | |
| 4,887,150 A | 12/1989 | Chiba et al. | |
| 4,901,088 A * | 2/1990 | Hertz et al. | 347/9 |
| 4,905,091 A | 2/1990 | Suzuki et al. | |
| 5,012,257 A | 4/1991 | Lowe et al. | |
| 5,278,582 A | 1/1994 | Hongo | |
| 5,387,976 A | 2/1995 | Lesniak | |
| 5,461,680 A | 10/1995 | Davis | |
| 5,578,813 A | 11/1996 | Allen et al. | |
| 5,581,295 A | 12/1996 | Prowak | |

(Continued)

FOREIGN PATENT DOCUMENTS

| | | | |
|---|---|---|---|
| AU | 2006252324 B1 | 1/2007 | |
| EP | 0655706 A1 | 5/1995 | |

(Continued)

OTHER PUBLICATIONS

U.S. Appl. No. 11/955,209, filed Dec. 12, 2007, Bledsoe, et al "Printing on Planar or Non-Planar Print Survace with Handhel Printing Device", 51 pages.

(Continued)

*Primary Examiner* — Beniyam Menberu

(57) ABSTRACT

Embodiments of the present invention provide apparatuses and methods for determining usage maps in handheld image deposition devices. The utilization of usage maps in combination with color planes may facilitate the output of varying levels of intensity. Additionally, the storage of processed images and the print data associated with various image locations of the processed image, according to a consistent offset of memory addresses, may expedite retrieval of print information.

22 Claims, 7 Drawing Sheets

(56) References Cited

U.S. PATENT DOCUMENTS

| | | | |
|---|---|---|---|
| 5,594,473 A * | 1/1997 | Miner et al. | 345/600 |
| 5,719,593 A | 2/1998 | De Lange | |
| 5,870,535 A | 2/1999 | Duffin et al. | |
| 5,927,872 A | 7/1999 | Yamada | |
| 5,930,466 A | 7/1999 | Rademacher | |
| 5,988,900 A | 11/1999 | Bobry | |
| 6,075,899 A | 6/2000 | Yoshioka et al. | |
| 6,213,586 B1 * | 4/2001 | Chen | 347/43 |
| 6,238,037 B1 * | 5/2001 | Overall et al. | 347/41 |
| 6,293,641 B1 | 9/2001 | Yoshimura et al. | |
| 6,339,480 B1 * | 1/2002 | Yamada et al. | 358/1.8 |
| 6,348,978 B1 | 2/2002 | Blumer et al. | |
| 6,384,921 B1 | 5/2002 | Saijo et al. | |
| 6,449,706 B1 * | 9/2002 | Chen et al. | 711/201 |
| 6,614,443 B1 * | 9/2003 | Peterson | 345/569 |
| 6,714,205 B1 | 3/2004 | Miyashita et al. | |
| 6,831,684 B1 * | 12/2004 | Ewedemi et al. | 348/222.1 |
| 6,995,868 B2 | 2/2006 | Quintana et al. | |
| 7,038,712 B1 | 5/2006 | Livingston et al. | |
| 7,200,560 B2 | 4/2007 | Philbert | |
| 7,297,912 B1 | 11/2007 | Todoroff et al. | |
| 7,410,100 B2 | 8/2008 | Muramatsu | |
| 7,607,749 B2 | 10/2009 | Tabata et al. | |
| 7,661,787 B2 | 2/2010 | Hoshiyama et al. | |
| 7,783,886 B2 | 8/2010 | Walmsley | |
| 7,929,019 B2 | 4/2011 | Ohmura et al. | |
| 7,949,370 B1 | 5/2011 | Bledsoe et al. | |
| 7,988,251 B2 | 8/2011 | Dimitrijevic et al. | |
| 8,223,384 B1 * | 7/2012 | Bledsoe et al. | 358/1.17 |
| 8,351,062 B2 | 1/2013 | Bledsoe et al. | |
| 8,472,066 B1 * | 6/2013 | Simmons et al. | 358/1.16 |
| 2002/0013890 A1 | 1/2002 | Nakata et al. | |
| 2002/0154186 A1 | 10/2002 | Matsumoto | |
| 2002/0158955 A1 | 10/2002 | Hess et al. | |
| 2003/0081244 A1 | 5/2003 | Clouthier et al. | |
| 2003/0150917 A1 | 8/2003 | Tsikos et al. | |
| 2004/0021912 A1 | 2/2004 | Tecu et al. | |
| 2004/0109034 A1 | 6/2004 | Brouhon | |
| 2004/0208346 A1 | 10/2004 | Baharav et al. | |
| 2004/0246526 A1 | 12/2004 | Ishigami et al. | |
| 2005/0001867 A1 | 1/2005 | Akase | |
| 2005/0212832 A1 * | 9/2005 | Hoshiyama et al. | 347/5 |
| 2006/0012660 A1 | 1/2006 | Dagborn | |
| 2006/0061647 A1 | 3/2006 | Breton | |
| 2006/0140036 A1 | 6/2006 | Yamamoto | |
| 2007/0150194 A1 | 6/2007 | Chirikov | |
| 2008/0007762 A1 | 1/2008 | Robertson et al. | |
| 2008/0144053 A1 | 6/2008 | Gudan et al. | |
| 2008/0212120 A1 | 9/2008 | Mealy et al. | |
| 2009/0034018 A1 | 2/2009 | Lapstun et al. | |
| 2009/0279148 A1 | 11/2009 | Lapstun et al. | |
| 2010/0039669 A1 | 2/2010 | Chang et al. | |
| 2010/0080486 A1 | 4/2010 | Maresch | |
| 2010/0231633 A1 | 9/2010 | Lapstun et al. | |

FOREIGN PATENT DOCUMENTS

| | | |
|---|---|---|
| EP | 0967784 A2 | 12/1999 |
| EP | 1209574 A2 | 5/2002 |
| JP | 2002-176629 | 6/2002 |
| JP | 2002307756 | 10/2002 |
| JP | 2006341604 | 12/2006 |
| WO | WO03/076196 A1 | 9/2003 |

OTHER PUBLICATIONS

U.S. Appl. No. 11/955,228, filed Dec. 12, 2007, Bledsoe et al., "Scanner for a Mobile Device", 34 pages.

U.S. Appl. No. 11/955,240, filed Dec. 12, 2007, Bledsoe et al., "Image Translation Device for a Mobile Device," 42 pages.

U.S. Appl. No. 11/955,258, filed Dec. 12, 02007, Simmons, et al., "Printer for a Mobile Device," 37 pages.

U.S. Appl. No. 11/959,027, filed Dec. 18, 2007, Simmons et al., "Ergonomic Design for a Handheld Image Translation Device," 25 pages.

U.S. Appl. No. 11/968,528, filed Jan. 2, 2008, Simmons et al., "Determining End of Print Job in Handheld Image Translation Device," 45 pages.

U.S. Appl. No. 12/013,313, filed Jan. 11, 2008, Bledsoe et al., "Adaptive Filtering Scheme in Handheld Positioning Device," 38 pages.

U.S. Appl. No. 12/016,833, filed Jan. 18, 2008, Simmons et al., "Sensor Positioning in Handheld Image Translation Device," 39 pages.

U.S. Appl. No. 12/036,996, filed Feb. 25, 2008, Bledsoe et al., "Determining Positioning of a Handheld Image Translation Device," 41 pages.

U.S. Appl. No. 12/037,029, filed Feb. 25, 2008, Bledsoe et al., "Definition of Print Image for Image Translation Device," 36 pages.

U.S. Appl. No. 12/037,043, filed Feb. 25, 2008, Bledsoe et al., "Bit Selection from Print in Image Transalation Device," 43 pages.

U.S. Appl. No. 12/038,660, filed Feb. 27, 2008, McKinley et al., "Providing User Feedback in Handheld Device," 40 pages.

U.S. Appl. No. 12/041,496, filed Mar. 3, 208, Mealy, "Handheld Image Translation Device," 40 pages.

U.S. Appl. No. 12/041,515, filed Mar. 3, 2008, Mealy et al., "Position Correction in Handheld Translation Device," 42 pages.

U.S. Appl. No. 12/041,535, filed Mar. 3, 2008, Mealy et al., "Dynamic Image Dithering," 34 pages.

U.S. Appl. No. 12/062,472, filed Apr. 3, 2008, McKinley et al., "Image Translation Device Providing Navigational Data Feedback to communication Device," 39 pages.

U.S. Appl. No. 12/188,056, filed Aug. 7, 2008, Mealy et al., "Controlling a Plurality of Nozzles of a Handheld Printer," 47 pages.

Fairchild, "IEEE 1284 Interface Design Solutions", Jul. 1999, Fairchild Semiconductor, AN-5010, 10 pages.

Texas Instruments, "Program and Data Memory Controller", Sep. 2004, SPRU577A, 115 pages.

* cited by examiner

| Memory Address | Contains Bits |
|---|---|
| Location 0 | Color A [31:0] |
| Location 1 | Color A [63:32] |
| Location 0 + Offset | Color B [31:0] |
| Location 1 + Offset | Color B [63:32] |
| Location 0 + 2*Offset | Color C [31:0] |
| Location 1 + 2*Offset | Color C [63:32] |
| ... | ... |
| Location 0 + 3*Offset | Usage Map 0 [31:0] |
| Location 1 + 3*Offset | Usage Map 0 [63:32] |
| Location 0 + 4*Offset | Usage Map 1 [31:0] |
| Location 1 + 4*Offset | Usage Map 1 [63:32] |
|  |  |

*Fig. 4*

| Two Bit Word | Number of Ink Drops |
|---|---|
| 0 0 | 1 |
| 0 1 | 2 |
| 1 0 | 3 |
| 1 1 | 4 |

*Fig. 6*

METHOD AND APPARATUS FOR STORING IMAGE DATA IN A MEMORY OF AN IMAGE DEPOSITION DEVICE

CROSS REFERENCE TO RELATED APPLICATIONS

The present disclosure is a continuation of and claims priority to U.S. patent application Ser. No. 11/972,462, filed Jan. 10, 2008, now U.S. Pat. No. 8,472,066, issued Jun. 25, 2013, which claims priority under 35 U.S.C. §119(e) to U.S. Provisional Patent Application No. 60/884,517, filed Jan. 11, 2007, which are incorporated herein by reference.

TECHNICAL FIELD

Embodiments of the present invention relate to the field of printing, and, more specifically, to providing a usage map in combination with a color plane to facilitate printing functions.

BACKGROUND

Traditional printing devices rely on a mechanically operated carriage to transport a print head in a linear direction as other mechanics advance a print medium in an orthogonal direction. As the print head moves over the print medium an image may be laid down. This systematic, translational movement of the print head and print medium allows for image data to be queued up in a predetermined and predictable manner. The print head may then advance over the print medium at a rate which allows all of the necessary ink to be deposited at each location. Once the print head has passed over a sufficient amount of the surface of the print medium to print the image in memory, the print job is complete.

While this memory allocation scheme may work well with traditional printers, the non-deterministic or random motion of handheld image deposition devices discourages the steady, consistent, and predictable advancement of the print head over the surface of the print medium. Consequently, alternative memory allocation schemes may be utilized to facilitate printing functionality. These alternative memory allocation schemes, however, pose new challenges in that they often include little information regarding the amount of ink required to fully describe a pixel. This may impact image quality.

SUMMARY

In view of the challenges in the state of the art, at least some embodiments of the present invention are based on the technical problem of providing usage maps for an image deposition device. More specifically, there is provided, in accordance with various embodiments of the present invention a method, which may include receiving an image from an image source; processing the image to provide a processed image having print data associated with each of a plurality of image locations; determining an offset based at least on the processed image; and storing the processed image and the print data in memory locations, the print data memory locations being separated from the processed image memory locations by the offset.

In some embodiments, the print data associated with each of the plurality of image locations may be a multiple bit word, and each bit of the multiple bit word may be stored in the print data memory locations separated by the offset. The two bit word may represent an intensity level and enable four possible intensity levels of a color plane at an image location.

In some embodiments, the processed image may include a plurality of color planes, and the print data associated with each of the plurality of image locations includes a two bit word for each image location of each of the plurality of color planes.

In some embodiments, the method may further include retrieving a two bit word for an image location of a color plane by locating a first bit of the two bit word, and utilizing the memory location of the first bit and the offset to locate a second bit of the two bit word.

In some embodiments, the method may further comprise decrementing the two bit word associated with the image location after a printing substance is output onto a print medium.

An apparatus may also be provided in accordance with various embodiments of the present invention. The apparatus may include a communication interface configured to receive an image from an image source; an image processing module configured to process the image to provide a processed image having print data associated with each of a plurality of image locations; a processor to determine an offset based on at least the processed image; and a memory controller configured to store the processed image and the print data in memory locations, the print data memory locations being separated from the processed image memory locations by the offset.

In some embodiments, the print data may be a multiple bit word, and the memory controller may be further configured to store each bit of the multiple bit word in the print data memory locations separated by the offset.

In some embodiments, the processed image includes a plurality of color planes, and the print data associated with each of the plurality of image locations includes a two bit word for each image location of each of the plurality of color planes.

In some embodiments the memory controller may be further configured to retrieve a two bit word for an image location of a color plane by locating a first bit of the two bit word, and utilizing the memory location of the first bit and the offset to locate a second bit of the two bit word.

In some embodiments the memory controller may be further configured to decrement the two bit word associated with the image location after a printing substance is output onto a print medium.

An apparatus may also be provided which includes means for receiving an image from an image source; means for processing the image to provide a processed image having print data associated with each of a plurality of image locations; means for determining an offset based at least on the processed image; and means for storing the processed image and the print data in memory locations, the print data memory locations being separated from the processed image by the offset.

In some embodiments, the print data associated with each of the plurality of image locations may be a multiple bit word, and each bit of the multiple bit word may be stored in the print data memory locations separated by the offset.

In some embodiments, the print data may represent one of four possible intensity levels of a color plane at an image location.

In some embodiments, the processed image may include a plurality of color planes, and the print data associated with each of the plurality of image locations includes a two bit word for each image location of each of the plurality of color planes.

In some embodiments, the apparatus may further include means for retrieving a two bit word for an image location of a color plane by locating a first bit of the two bit word, and utilizing the memory location of the first bit and the offset to locate a second bit of the two bit word.

In some embodiments, the apparatus may further comprise means for decrementing the two bit word associated with the image location after a printing substance is output onto a print medium.

An article of manufacture is also provided in accordance with various embodiments of the present invention. The article of manufacture may include a computer readable medium; and a plurality of programming instructions stored on the computer readable medium designed to enable a device to receive an image from an image source; process the image to provide a processed image having print data associated with each of the plurality of image locations; determine an offset based at least on the processed image; and store the processed image and the print data in memory locations, the print data memory locations being separated from the processed image memory locations by the offset.

In some embodiments, the print data associated with each of the plurality of image locations is a multiple bit word, and the plurality of programming instructions are further designed to enable the device to store each bit of the multiple bit word in the print data memory locations separated by the offset.

In some embodiments the processed image may include a plurality of color planes, and the print data associated with each of the plurality of image locations includes a two bit word for each image location of each of the plurality of color planes.

In some embodiments, the print data may represent an intensity level, and the print data may be a two bit word that may enable one of four different intensity levels.

In some embodiments, the programming instructions may be further designed to enable the device to retrieve a two bit word for an image location of a color plane by locating a first bit of the two bit word, and utilizing the memory location of the first bit and the offset to locate a second bit of the two bit word.

In some embodiments, the programming instructions may be further designed to enable a device to decrement the two bit word associated with the image location after a printing substance is output onto a print medium.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 4 illustrates a table representation of memory addresses and a memory allocation scheme in accordance with various embodiments of the present invention;

FIG. 6 illustrates a table representation of intensity levels associated with the usage maps in accordance with various embodiments of the present invention.

DETAILED DESCRIPTION OF EMBODIMENTS OF THE INVENTION

Figure 1:
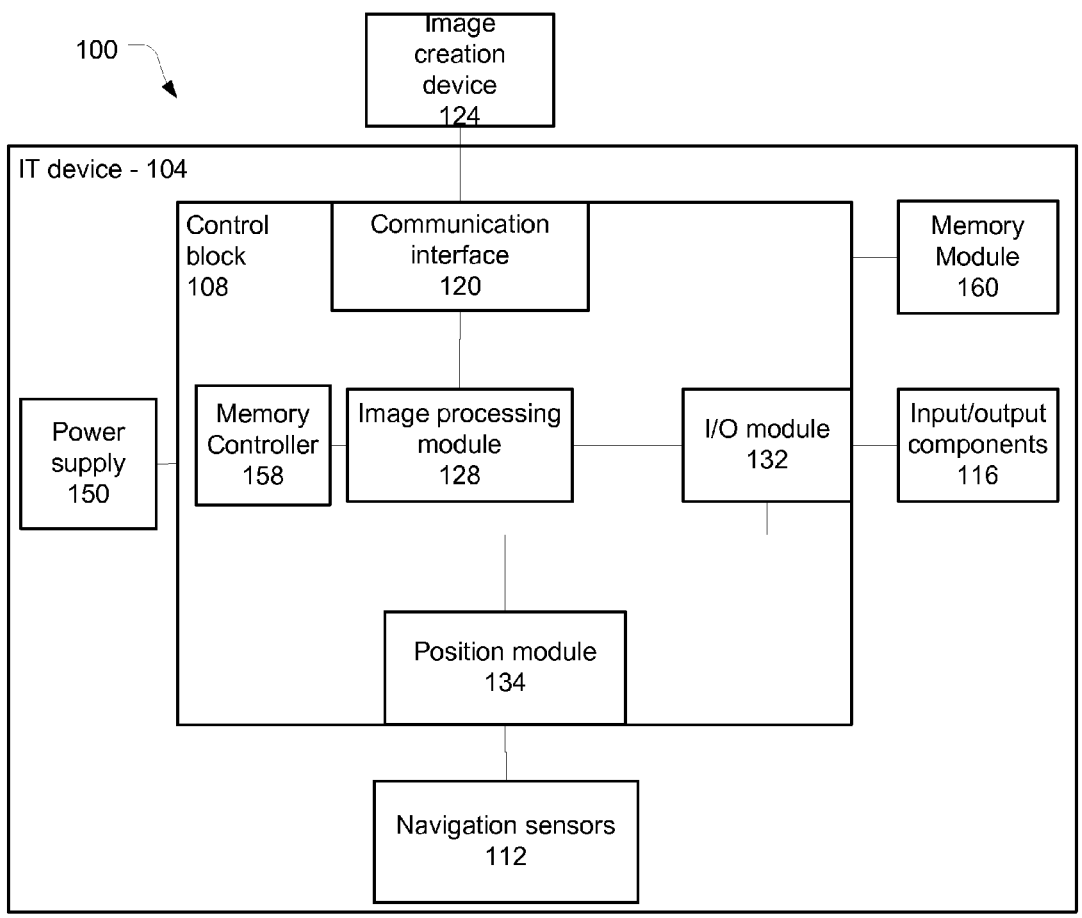
FIG. 1 is a schematic of a system including a handheld image deposition device in accordance with various embodiments of the present invention.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)".

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

For purposes of the description, the words "print," "printing," etc. refer to any action that causes a representation of the image to be deposited on a medium adjacent to the image deposition device.

In various embodiments of the present invention, methods, apparatuses, and systems for outputting images with varying levels of intensity are provided. In exemplary embodiments of the present invention, a memory allocation scheme may be utilized where an image is processed to provide separate color planes. Each color plane may be composed of a plurality of bits, with each bit representing that color plane's portion of a pixel. One bit, however, may not provide enough information to fully describe the pixel. Therefore, in various embodiments, a plurality of usage maps may be generated to describe various intensity levels of a pixel. For example, the color plane may indicate whether a pixel requires ink to be output onto a print medium for that particular color plane, and a usage map may indicate the intensity level for outputting the ink. To facilitate access to the usage maps, the usage maps may be stored in consecutive memory address in the same manner as the individual color planes, i.e., separated by a consistent offset. In various embodiments a computing system may be endowed with one or more components of the disclosed apparatuses and/or systems and may be employed to perform one or more methods as disclosed herein.

FIG. 1 is a schematic of a system 100 including a handheld image deposition (ID) device 104 in accordance with various embodiments of the present invention. The ID device 104 may include a control block 108 with components designed to control one or more navigation sensors 112 in a manner to facilitate precise and accurate positioning of one or more input/output components 116 throughout an entire ID operation. This positioning may allow the ID device 104 to reliably create an image in a truly mobile and versatile platform.

Image deposition, as used herein, may refer to a deposition of an image that exists in an electronic context (e.g., medium) into an image in a physical context. For example, an ID operation may be a print operation. In this situation, an acquired image, e.g., an image as it exists in memory module 160 of the ID device 104, may be printed onto a print medium.

The control block 108 may include a communication interface 120 configured to communicatively couple the control block 108 to an image creation device 124. The image creation device 124 may include any type of device capable of transmitting/receiving data related to an image involved in an ID operation. The image creation device 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image creation device 124 is a removable storage device, e.g., a universal serial bus (USB) storage device, the communication interface 120 may be coupled to a port, e.g., USB port, of the ID device 104 designed to receive the storage device.

The communication interface 120 may include a wireless transceiver to allow the communicative coupling with the image creation device 124 to take place over a wireless link. The image data may be wirelessly transmitted over the link through the modulation of electromagnetic waves with frequencies in the radio, infrared, or microwave spectrums.

A wireless link may contribute to the mobility and versatility of the ID device 104. However, some embodiments may additionally/alternatively include a wired link communicatively coupling the image creation device 124 to the communication interface 120.

In some embodiments, the communication interface 120 may communicate with the image creation device 124 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The image creation device 124 may transfer image data related to an image to be printed to the ID device 104 through the communication interface 120. The communication interface 120 may then transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image creation device 124 or another device. The processed image may then be transmitted to an input/output (I/O) module 132, which may function as a print module in this embodiment, where it is stored in anticipation of the printing of the image.

In other embodiments, the processed image may be transmitted to memory controller 158 to store the processed image in memory module 160 according to a predefined memory allocation scheme to facilitate extraction at a later time. Memory module 160 may include random access memory (RAM), dynamic RAM (DRAM), static RAM (SRAM), synchronous DRAM (SDRAM), dual-data rate RAM (DDRRAM), etc, the invention is not to be limited in this regard. Memory module 160 may be coupled to the control block 108 and communicate directly or indirectly with every element therein. Additionally, memory controller 158 may also access memory 160 in preparation for print functions.

The I/O module 132 may also receive positioning information, indicative of a position of a print head of the I/O components 116 relative to a reference location, from a position module 134. The position module 134 may control the navigation sensors 112 to track incremental movement of the ID device 104 relative to a reference location.

Once the I/O module 132 receives the positioning information it may coordinate the location of the print head to a portion of the processed image with a corresponding location. The I/O module 132 may then control the print head in a manner to deposit a printing substance on a print medium adjacent to the ID device 104 to represent the corresponding portion of the processed image.

A print medium, as used herein, may be any type of medium on which a printing substance, e.g., ink, powder, etc., may be deposited. It may also include a medium that creates an image through precisely controlled heating at certain locations (which requires thermal paper). It may not be limited to print paper or other thin, flexible print medium commonly associated with traditional printing devices.

The print head may be an inkjet print head having a plurality of nozzles designed to emit liquid ink droplets. The nozzles may be arranged in a variety of configurations, the invention is not to be limited in this regard. The ink, which may be contained in reservoirs or cartridges, may be black and/or any of a number of various colors. A common, full-color inkjet print head may have nozzles for cyan, magenta, yellow, and/or black ink, for example. Other embodiments may utilize other printing techniques, e.g., toner-based printers such as laser or LED printers, solid ink printers, dye-sublimation printers, inkless printers, etc.

A composite image acquired by the ID device 104 may be subsequently stored locally by the ID device 104 in memory module 160, as an example, for subsequent review, transmittal, printing, etc. Prior to storage in memory module 160, image processing module 128 may perform various image processing techniques on the received image. Image processing techniques may include dithering, decompression, half-toning, and/or color plane separation, and memory controller 158 may store the processed image in memory module 160 according to various memory allocation schemes.

The ID device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image creation device 124, a power cord coupled to an alternating current (AC) outlet, etc.).

Figure 2:
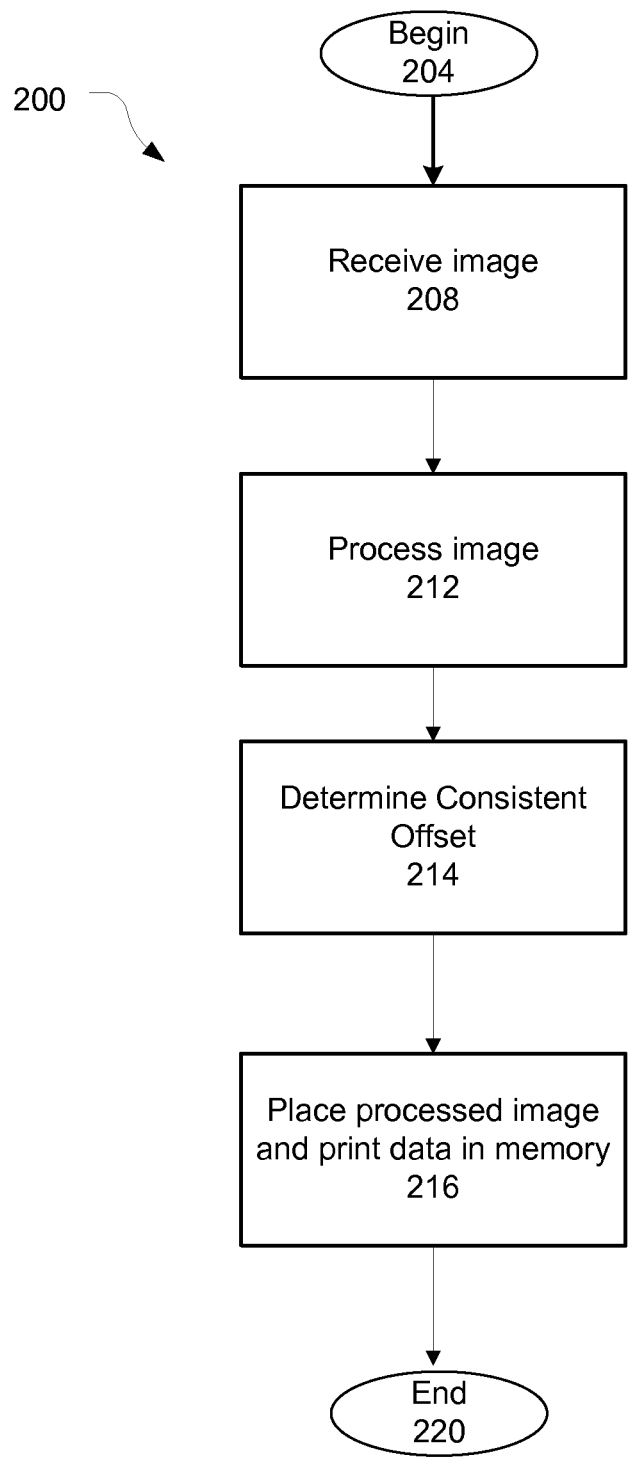
FIG. 2 illustrates a flow diagram depicting the defining of a usage map in a handheld image deposition device in accordance with various embodiments of the present invention.

FIG. 2 is a flow diagram 200 depicting the defining of a usage map in a handheld image deposition device in accordance with various embodiments of the present invention. A usage map defining operation may begin in block 204 with an initiation of a scanning or printing operation. The source of the image may include external devices, external images, digital images, etc. The invention is not to be limited in this regard. An image processing module may receive an image in block 208. The image may be received in preparation for a print function. The image processing module 128 may receive the image from a communication interface or, in the event that an image previously received needs to be reprocessed, from storage and/or memory.

The image processing module 128 may process the image in block 212 to provide a processed image having print data associated with each of a plurality of image locations. Processing the image, in one embodiment, involves separating the received image into a plurality of color planes, each color plane having a plurality of bits, i.e., color plane separation. The received image may be divided into multiple color planes, including but not limited to cyan, magenta, yellow, and/or black, for example. Image processing may include the separation of an image into more or fewer color planes of various colors. Each bit of a color plane may represent that color plane's portion of a pixel of the received image, and may be associated with a bit in each of the other color planes. The associated bits from each of the color planes may cooperatively describe one pixel of the received image. Alternatively, more bits from each color plane may be used to represent that color plane's portion of a pixel of the received image, thereby allowing for a more detailed representation of the pixel.

The print data associated with each of the plurality of image locations may include usage maps. The generation of usage maps may include generating two or more usage maps in which the individual bits from each usage map may be combined to describe the intensity with which a bit of a color plane is to be output. As used herein, a usage map consists of multiple bits, where each bit is associated with a bit of a color plane, and a bit in each of the other usage maps. The associated bits of all the usage maps may be combined to form a bit word, the bit word may be associated with the bit of a color plane. For instance, if there are two usage maps, each bit word will be two bits long and may signify four intensity levels; if there are three usage maps, each bit word will be three bits long and may signify eight intensity levels. An intensity level may be defined as the number of ink droplets per pixel.

At block 214 the ID device may determine a consistent offset based at least on the processed image. Alternatively, the consistent offset may be determined based on memory capacity, the number of color planes, and/or the size of the received image. The consistent offset may be utilized in storing the plurality of color planes and the usage maps in memory. A consistent offset may be used to minimize calculations necessary to locate and retrieve bits from each of the individual color planes and the usage maps. For example, each bit of the plurality of bits for a color plane may be separated from its associated bits in each of the other color planes and usage maps by the consistent offset. This may allow an ID device to locate one bit of a color plane using an algorithm and quickly find other associated memory locations by utilizing the consistent offset. In various embodiments, the consistent offset may be determined before or after the image has been processed based on various characteristics of the received image. Still further, the consistent offset may be calculated by the image creation device 124 and transmitted to the ID device along with the transmitted image.

The ID device, at block 216, may place the processed image and the print data, e.g. usage maps, in memory with the print data memory locations separated from the processed image memory locations by the consistent offset. Each of the bits of an individual color plane, e.g. the processed image, may be stored in consecutive memory addresses as a dot array, which may be arranged as the image is to be printed, i.e., a plot of the memory space may show a monochrome, magnified version of the image. Additionally, the plurality of bits for a color plane may be separated from their associated bits in each of the other color planes and their respective usage maps by the consistent offset.

As an example, if usage map(0) contained a zero in bit position(1) and usage map(1) contained a one in bit position (1), the bit word would be (0 1) and would be associated with the bit in bit position(1) of a particular color plane. Bit position(1) for each of the usage maps and the color plane would be separated by the consistent offset. Consequently, that color plane's portion of a pixel may require two drops of the color plane's ink to fully describe that color plane's portion of the pixel.

In various embodiments, to facilitate storage, and utilization of the offset, each of the plurality of color planes and usage maps may be stored in a memory address beginning at bit zero. Alternatively, however, the plurality of color planes may be stored in consecutive memory addresses which begin at various other bits within a memory address for more efficient usage of the memory capacity. Once the image is defined in memory, the method may end at block 220.

Figure 3:
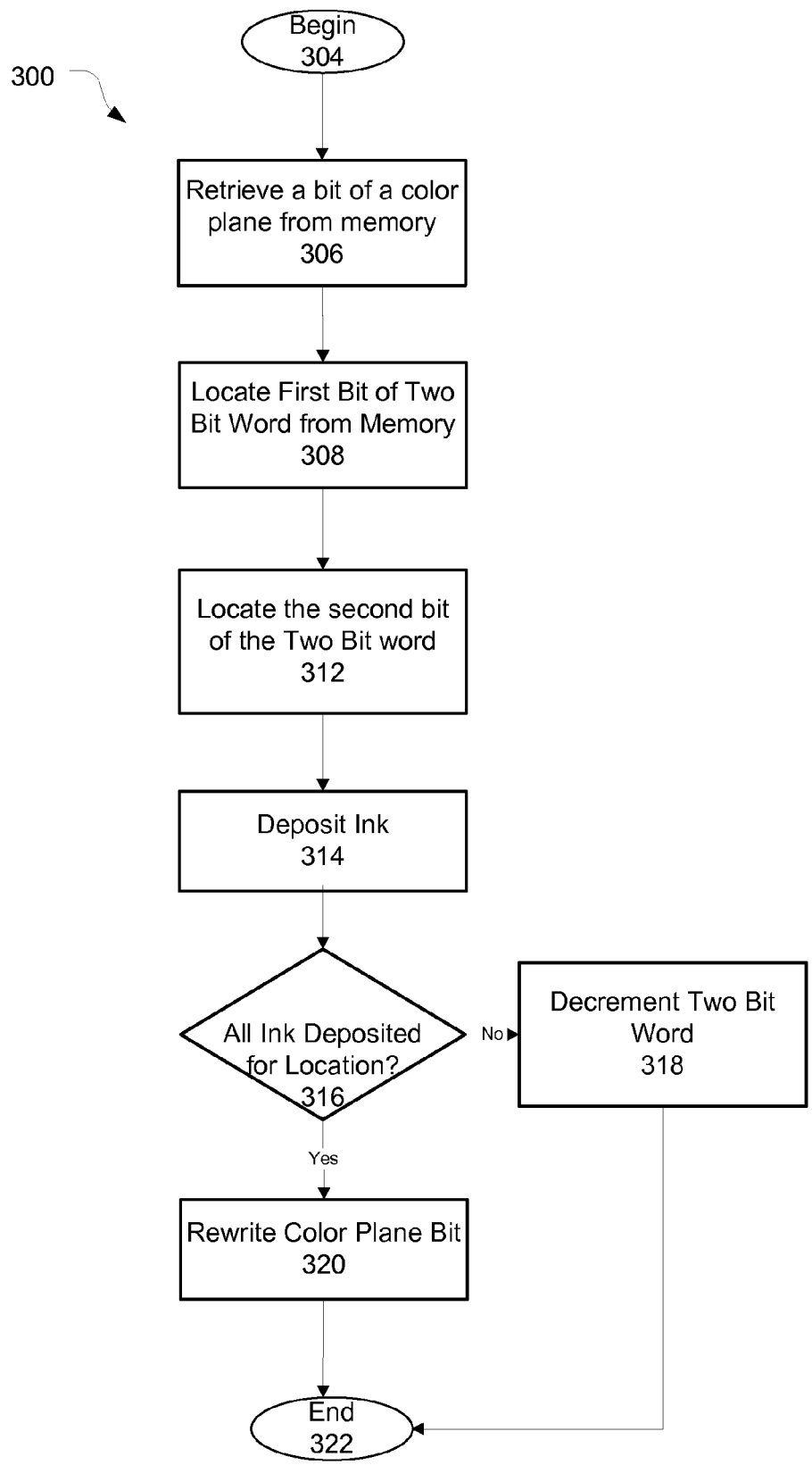
FIG. 3 illustrates a flow diagram depicting a printing operation in accordance with various embodiments of the present invention.

FIG. 3 illustrates a flow diagram depicting a printing operation in accordance with various embodiments of the present invention. The method 300 may begin at block 304 with a request to output a defined image. At block 306, a memory controller may retrieve one of the plurality of bits stored in the memory module which corresponds to a bit of a color plane. The retrieved bit may correspond to that color plane's portion of a pixel which is to be output onto the print medium at a desired location. The bit may be accessed by determining the position of the ID device, with reference to the print medium, and by utilizing an algorithm to locate the appropriate memory address out of the consecutive memory addresses for each color plane. The bit to be retrieved may be associated with any of the plurality of color planes and located at any memory address.

At block 308, the ID device may locate the first bit of the two bit word in the print data memory locations. The first bit may be stored in a first usage map. To locate the first bit of the two bit word, the ID device may use the memory address of the retrieved bit and the consistent offset utilized to store the plurality of bits. The memory address of the first bit of the two bit word may be a multiple of the consistent offset.

Once the first bit has been retrieved, the process may continue to block 312 where the ID device may locate a second bit of a two bit word. The second bit of the two bit word, like the first, may be located using the processed image memory location of the retrieved bit of the color plane and the consistent offset. Alternatively, the second bit may be located using the print data memory location of the first bit and the consistent offset. Utilization of the consistent offset and the memory address of the retrieved bit may involve a plurality of algorithms and functions, including but not limited to, addition, subtraction, and multiplication functions. Additionally, in other embodiments, there may be more than two usage maps. In such instances, each bit from the additional usage maps may be located in the same manner.

At block 314, the ID device may deposit ink. To determine the amount of ink to deposit, the ID device may combine the bits from the usage maps to generate a bit word representing a binary number. The binary number will be further discussed herein with reference to FIG. 6.

At block 316, a decision is made as to whether all the ink has been deposited for the image location. If all of the ink has not been deposited for the particular color plane at the image location, the ID device may proceed to block 318 where the ID device may decrement the two bit word after outputting a printing substance on a print medium, thereby indicating that on the next pass a lesser amount of printing substance need be applied. If, however, all the printing substance was applied to the image location, the ID device may rewrite the color plane bit to a zero at block 320 thereby indicating that no further writing to the image location is needed. The method may then end for the particular color plane at block 322 and may repeat for each of the other color planes until the entire image may be transferred to the print medium.

FIG. 4, in accordance with various embodiments of the present invention, illustrates a table representation of a memory module 400 having an image and usage maps defined therein. Memory address column 402 illustrates an embodiment of the consecutive memory addresses used for each of the color planes 408, 410, and 412. Additionally, column 402 includes the consecutive memory addresses for two usage maps 416, and 418 which correspond to color plane A. While not illustrated, color planes B and C may also have corresponding image maps. The memory locations for each of the plurality of color planes and usage maps may begin at address location 0 and be further defined with reference to a consistent offset, e.g., beginning at location 0, plus an offset 406. Column 404 contains the consecutive bits of each of the plurality of color planes and usage maps. In the illustrated embodiment, each color plane and usage map includes 64 bits. Color planes and usage maps may include more or fewer bits.

Memory module 400, in the illustrated embodiment, has a defined image including three color planes, A, B, and C and two usage maps, 0 and 1, elements 408, 410, 412, 416, and 418, respectively. Each of the bits in color plane A 408, may be associated with bits in color planes B and C, and have associated bits in usage maps 0, and 1. In various embodiments, the color plane bits may represent whether ink is to be put down on the print medium, while the usage maps 416, 418 describe the intensity level (number of ink droplets) required. As an example, bit 15 of color plane A may indicate color A is needed. Associated bits 15 of color planes B, and C, may indicate the colors are not needed, and consequently the pixel may comprise only ink associated with color plane A. Associated bits 15 of usage maps 0 and 1 may combine to form a two bit word indicating that 2 drops of color A is required to be put down. Because color planes B and C do not indicate ink is needed, their corresponding usage maps do not need to be referenced.

Figure 5:
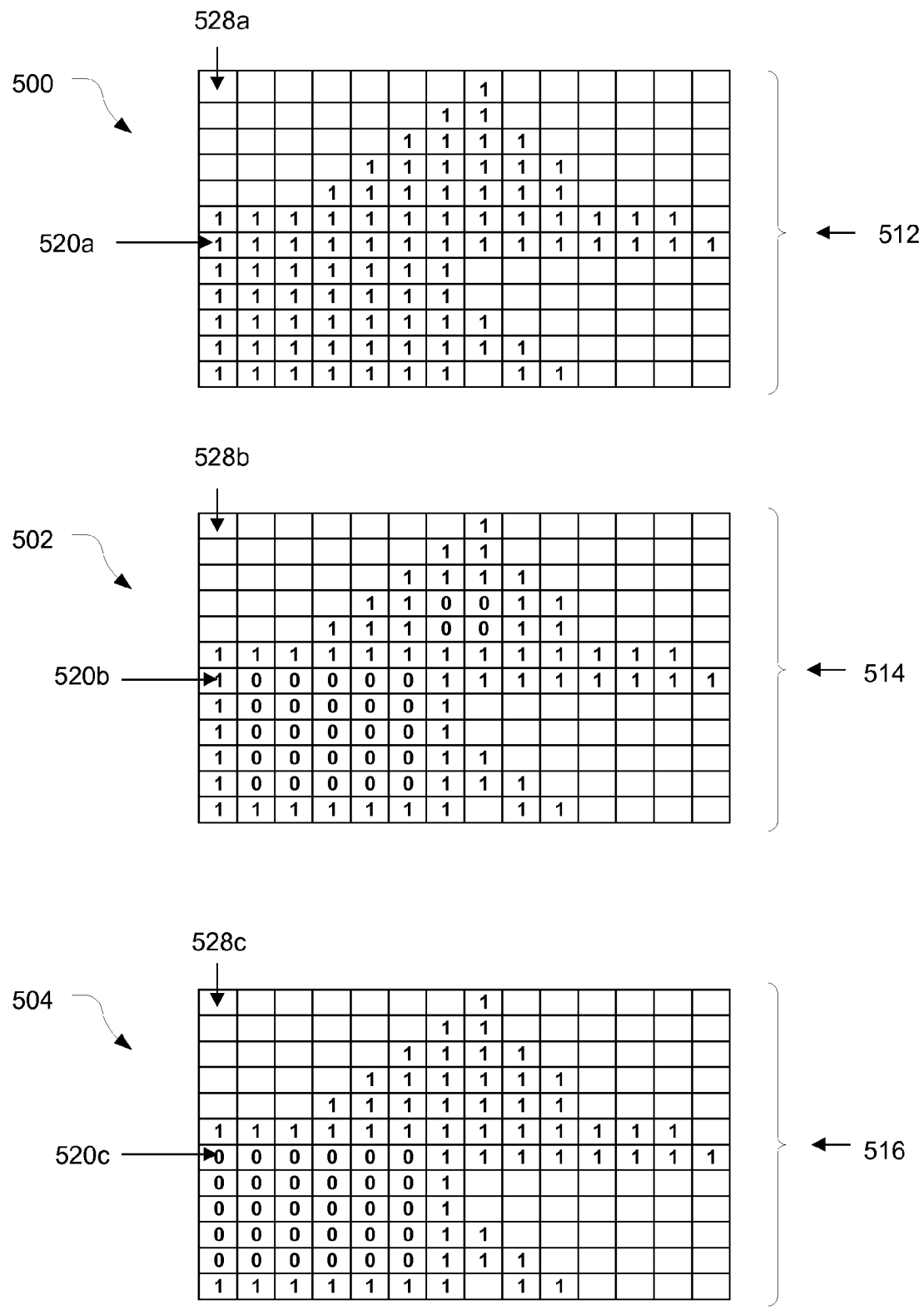
FIG. 5 illustrates a diagram of a color plane and its corresponding usage maps in accordance with various embodiments of the present invention.

FIG. 5. illustrates a diagram of a color plane and its respective usage maps as defined in memory, in accordance with various embodiments of the present invention. In the illustrated embodiment, the memory module includes one color plane 500, and two usage maps 502, and 504. The color plane may include a plurality of bits which are designated as either a "1" or a blank for illustrative purposes. The usage maps 502, 504 may include a plurality of bits which are designated as either a "1" or a "0" for illustrative purposes. The empty cells in FIGS. 502 and 504 have been left blank for ease of understanding, and generally will be written with "0s".

The plurality of bits for the color plane and the two usage maps are stored in consecutive memory addresses 512, 514, and 516, as dot arrays. The individual bits within consecutive memory addresses 512, 514, and 516 may be separated by a consistent offset, and each bit of the color plane may have associated bits in each of the usage maps. For example, bit 520a in color plane 500 has associated bits 520b and 520c in usage maps 502 and 504. Continuing with this example, an ID device may attempt to output bit 520a of color plane 500. Upon locating the bit, the ID device may recognize the bit as a "1" indicating ink is to be output. Subsequently, the ID device may locate the first bit of the two bit word associated with the intensity level. Using the memory address of bit 520a and the consistent offset, the ID device may locate bit 520b and subsequently 520c. The ID device may combine these two bits to form a two bit word signifying the intensity level of the bit 520a. In the illustrated embodiment, the two bit word would be (1 0). Referencing FIG. 6, this may indicate that three droplets of color plane 500's ink may be needed to describe color plane 500's portion of the pixel. Similarly, if bit 528a was located, the ID device may recognize it as a blank and that no ink is to be laid down. In this scenario the ID device may move onto the next bit to be output and disregard the usage maps. This method may be followed for each color plane indicating ink is to be dropped for the pixel or image location. All of the associated bits may be located by utilizing the consistent offset and the memory address of any one of the associated bits.

Figure 6:
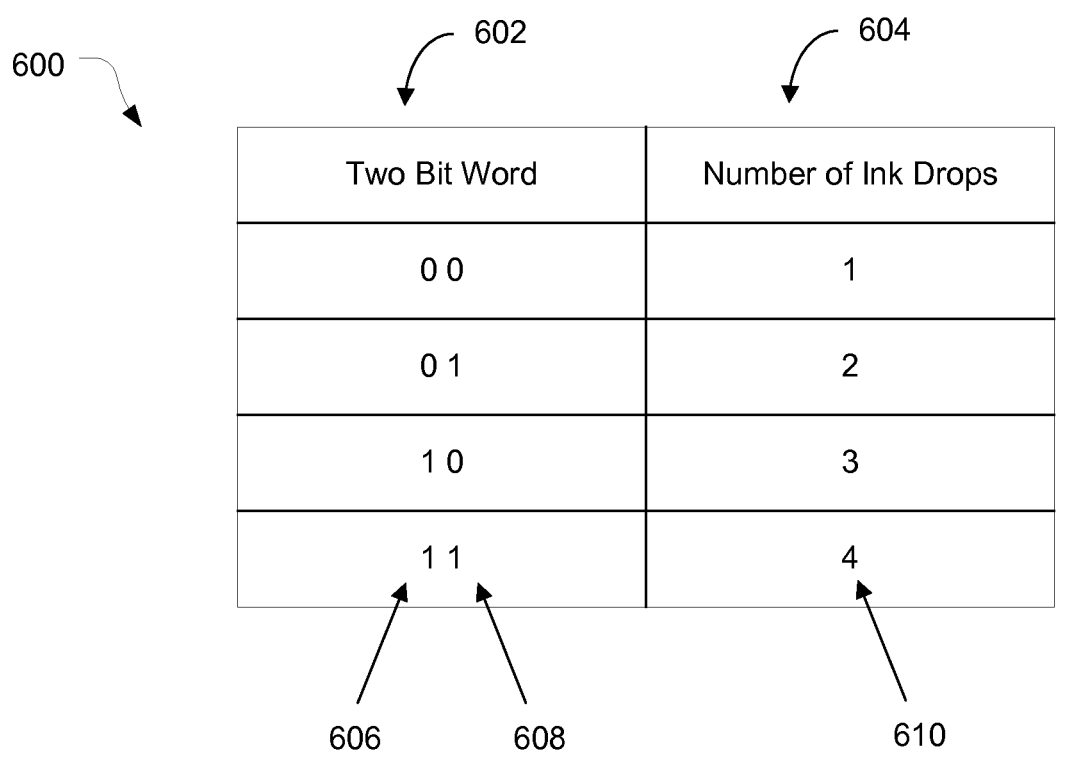

FIG. 6 illustrates a table representation of intensity levels associated with the usage maps in accordance with various embodiments of the present invention. Table 600 includes column 602 listing possible variations of a two bit word, while column 604 lists their value in a decimal format. The two bit word may be composed of two usage maps each having a bit stored therein. As an example, the first usage map may store a value 606, while the second usage map may store a value 608. The two bits may be combined to form a two bit word representing the intensity of the color plane at an image location, in binary. In one embodiment the two bit words (0 0), (0 1), (1 0), and (1 1) represent 1, 2, 3, and 4, respectively 610. In various other embodiments, more usage maps may be included to increase the number of bits in a bit word. This may, effectively, allow for more intensity levels.

Figure 7:
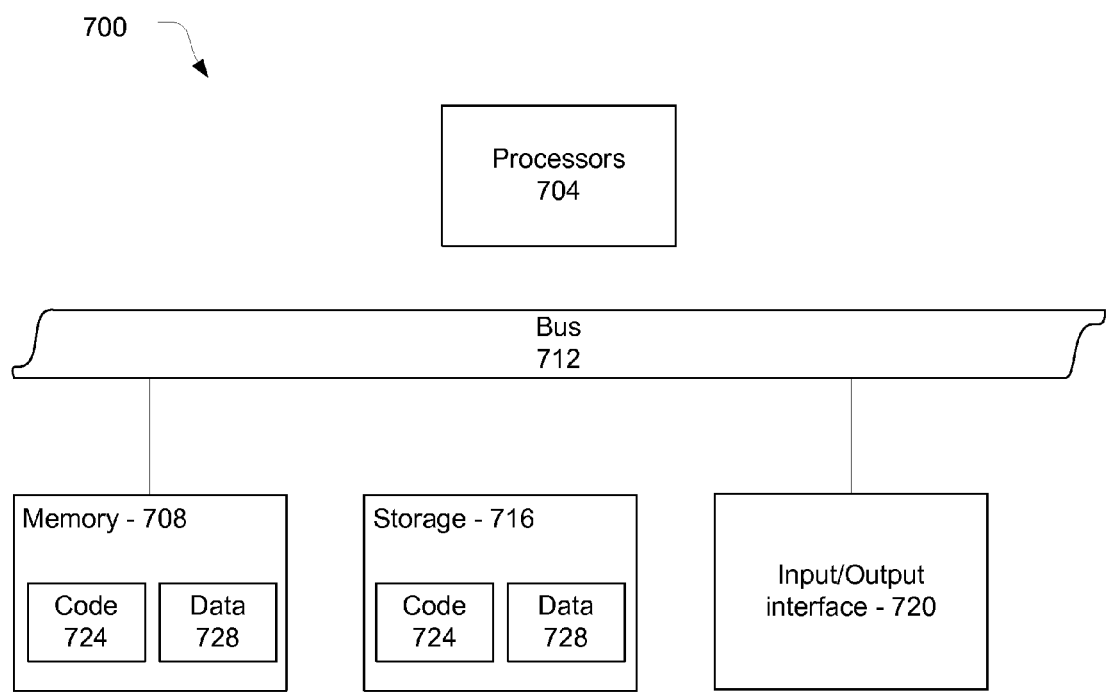
FIG. 7 illustrates a computing device capable of implementing a control block of a handheld image deposition device in accordance with various embodiments of the present invention.

FIG. 7 illustrates a computing device 700 capable of implementing a control block, e.g., control block 108, in accordance with various embodiments. As illustrated, for the embodiments, computing device 700 includes one or more processors 704, memory 708, and bus 712, coupled to each other as shown. Additionally, computing device 700 includes storage 716, and one or more input/output interfaces 720 coupled to each other, and the earlier described elements as shown. The components of the computing device 700 may be designed to provide the positioning functions of a control block of an ID device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of the control block in accordance with embodiments of this invention. The processing data 728 may include data to be acted upon by the instructions of the code 724. In particular, the accessing of the code 724 and data 728 by the processors 704 may facilitate image deposition and/or positioning operations as described herein.

The processors 704 may include one or more single-core processors, multiple-core processors, controllers, application-specific integrated circuits (ASICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 716 may be a storage resource physically part of the computing device 700 or it may be accessible by, but not necessarily a part of, the computing device 700. For example, the storage 716 may be accessed by the computing device 700 over a network.

The I/O interfaces 720 may include interfaces designed to communicate with peripheral hardware, e.g., I/O components 116, navigation sensors 112, etc., and/or remote devices, e.g., image creation device 124.

In various embodiments, computing device 700 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
receiving an image from an image source;
processing the image to provide a processed image, wherein the processed image comprises a plurality of pixels, wherein a first pixel of the plurality of pixels is represented by a plurality of bits, and wherein the plurality of bits comprises a first bit, a second bit, and a third bit, wherein the first bit, the second bit and the third bit, in combination, are useable to selectively deposit printing material of a first color corresponding to the first pixel while depositing the image onto a medium; and
storing the plurality of bits corresponding to the first pixel of the plurality of pixels in a memory such that
the first bit of the plurality of bits is stored in a first memory address of the memory,
the second bit of the plurality of bits is stored in a second memory address of the memory,
the third bit of the plurality of bits is stored in a third memory address of the memory,
the first memory address is separated from the second address by a first integer multiple of an offset, wherein the offset is greater than one bit,
the first memory address is separated from the third memory address by a second integer multiple of the offset,
the first memory address and the second address are non-consecutive memory addresses in the memory such that a first plurality of memory addresses in the memory are included between the first memory address and the second address, and
none of the first plurality of memory addresses in the memory stores any bit that is useable to selectively deposit printing material of the first color corresponding to the first pixel.

2. The method of claim 1, further comprising:
based on the stored plurality of bits, depositing the image onto the medium.

3. The method of claim 2, wherein:
the first bit provides an indication of whether the printing material of the first color is to be deposited corresponding to the first pixel while depositing the image onto the medium; and
the second bit and the third bit, in combination, provides an indication of an amount of the printing material of the first color to be deposited corresponding to the first pixel while depositing the image onto the medium.

4. The method of claim 2, wherein:
the first bit provides an indication of whether the printing material of the first color is to be deposited corresponding to the first pixel while depositing the image onto the medium; and
the second bit and the third bit, in combination, provides an intensity level associated with a first color plane of a plurality of color planes and for the first pixel of the plurality of pixels.

5. The method of claim 3, further comprising:
determining the offset based on one of (i) the processed image or (ii) a capacity of the memory.

6. The method of claim 1, wherein:
the first integer multiple is one; and
the second integer multiple is two.

7. The method of claim 1, further comprising:
while depositing the image onto a medium, retrieving the second bit from the memory by
locating the first bit in the first memory address of the memory, and
based on (i) the first memory address of the memory and (ii) the first integer multiple of the offset, locating the second bit in the second memory address of the memory.

8. The method of claim 1, wherein the first bit provides an indication of whether printing material is to be deposited corresponding to the first pixel while depositing the image onto a medium, wherein the second bit and the third bit, in combination, provides an indication of an amount of printing material to be deposited corresponding to the first pixel while depositing the image onto the medium, and wherein the method further comprises:
while depositing the image onto the medium and based on the first bit, the second bit and the third bit, depositing printing material corresponding to the first pixel of the plurality of pixels; and
based on depositing the printing material corresponding to the first pixel of the plurality of pixels, updating values of the first bit, the second bit and the third bit in the memory.

9. An image deposition device comprising:
a communication interface configured to receive an image from an image source;
an image processing module configured to process the image to provide a processed image, wherein the processed image comprises a plurality of pixels, wherein a first pixel of the plurality of pixels is represented by a plurality of bits, and wherein the plurality of bits comprises a first bit, a second bit, and a third bit, wherein the first bit, the second bit and the third bit, in combination, are useable to selectively deposit printing material of a first color corresponding to the first pixel while depositing the image onto a medium; and a memory controller configured to store the plurality of bits corresponding to the first pixel of the plurality of pixels in a memory such that the first bit of the plurality of bits is stored in a first memory address of the memory, the second bit of the plurality of bits is stored in a second memory address of the memory, the third bit of the plurality of bits is stored in a third memory address of the memory, the first memory address is separated from the second address by a first integer multiple of an offset, wherein the offset is greater than one bit, the first memory address is separated from the third memory address by a second integer multiple of the offset, the first memory address and the second address are non-consecutive memory addresses in the memory such that a first plurality of memory addresses in the memory are included between the first memory address and the second address, and none of the first plurality of memory addresses in the memory stores any bit that is useable to selectively deposit printing material of the first color corresponding to the first pixel.

10. The image deposition device of claim 9, further comprising:

an input/output module configured to, based on the stored plurality of bits, facilitate depositing the image onto the medium.

11. The image deposition device of claim 10, wherein:

the first bit provides an indication of whether printing material of the first color is to be deposited corresponding to the first pixel while the image is being deposited onto the medium, and the second bit and the third bit, in combination, provides an indication of an amount of printing material of the first color to be deposited corresponding to the first pixel while the image is being deposited onto the medium.

12. The image deposition device of claim 10, wherein:

the first bit provides an indication of whether printing material of the first color is to be deposited corresponding to the first pixel while the image is being deposited onto the medium; and the second bit and the third bit, in combination, provides an intensity level associated with a first color plane of a plurality of color planes and for the first pixel of the plurality of pixels.

13. The image deposition device of claim 11, further comprising:

a processor configured to determine the offset based on one of (i) the processed image or (ii) a capacity of the memory.

14. The image deposition device of claim 9, wherein:
the first integer multiple is one; and
the second integer multiple is two.

15. The image deposition device of claim 9, wherein the image deposition device is configured to:

retrieve the second bit from the memory by locating the first bit in the first memory address of the memory, and based on (i) the first memory address of the memory and (ii) the first integer multiple of the offset, locating the second bit in the second memory address of the memory.

16. The image deposition device of claim 9, wherein the first bit provides an indication of whether printing material is to be deposited corresponding to the first pixel while printing the image, wherein the second bit and the third bit, in combination, provides an indication of an amount of printing material to be deposited corresponding to the first pixel while printing the image, and wherein the image deposition device is configured to:

based on the first bit, the second bit and the third bit, deposit printing material corresponding to the first pixel of the plurality of pixels; and based on depositing the printing material corresponding to the first pixel of the plurality of pixels, update values of the first bit, the second bit and the third bit in the memory.

17. The image deposition device of claim 9, wherein:
none of the first plurality of memory addresses in the memory stores any bit of the plurality of bits.

18. The image deposition device of claim 9, wherein:
none of the first plurality of memory addresses in the memory stores any bit that is useable to selectively deposit printing material corresponding to the first pixel.

19. The image deposition device of claim 9, wherein:
the second memory address and the third address are non-consecutive memory addresses in the memory such that a second plurality of memory addresses in the memory are included between the first memory address and the second address; and none of the second plurality of memory addresses in the memory stores any bit of the plurality of bits corresponding to the first pixel of the plurality of pixels.

20. The method of claim 1, wherein:
none of the first plurality of memory addresses in the memory stores any bit of the plurality of bits.

21. The method of claim 1, wherein:
none of the first plurality of memory addresses in the memory stores any bit that is useable to selectively deposit printing material corresponding to the first pixel.

22. The method of claim 1, wherein:
the second memory address and the third address are non-consecutive memory addresses in the memory such that a second plurality of memory addresses in the memory are included between the first memory address and the second address; and none of the second plurality of memory addresses in the memory stores any bit of the plurality of bits corresponding to the first pixel of the plurality of pixels.

* * * * *